Patented Oct. 18, 1927.

1,645,642

UNITED STATES PATENT OFFICE.

THOMAS BLACKADDER, OF GREAT NECK, NEW YORK.

TREATING LEATHER.

No Drawing.  Application filed October 1, 1925. Serial No. 59,950.

This invention relates to treating leather; and it comprises a method of treating leather, which is also applicable to other porous materials, for softening and waterproofing the same wherein oily or fatty or soft materials are introduced into such leather or like material as a reversed emulsion, an emulsion wherein oily material is a continuous or outer phase and other materials are emulsified therein; all as more fully hereinafter set forth and as claimed.

Leather and other materials are often waterproofed by introducing oily or greasy matters in the form of an emulsion. In the case of leather, this operation is known as "fat liquoring". The usual method is to dissolve soda soap, Turkey red oil, stearamid or other emulsifying agent in water and then incorporate oily or greasy matter into the liquid as an emulsion; this emulsion being of the oil-in-water type with the aqueous liquid as the outer or continuous phase, and the oily liquid as the inner or disperse phase. The method while extensively used does not give completely satisfactory results, this being in part due to the fundamental difficulty that when such an emulsion dries down in the leather, the emulsifying agent (soap, etc.) is dried down and is ready to become active again when water re-enters the leather. Leather so treated is in a state of having oil on the fiber in intimate admixture with an emulsifying agent which is adapted to emulsify said oil as soon as water enters. What water has put into the leather, water will remove again. All emulsifying agents capable of making emulsions of oil in water are more or less soluble in water.

I have found that I can produce much better results by using the reverse type of emulsion, one having the watery liquid as the inner phase and the oily liquid as the outer phase. Emulsifying agents for the oil-in-water type of emulsion are more soluble in the polar liquid, water: whereas emulsifying agents for the water-in-oil type of emulsion are more soluble in the non-polar liquid, oil. Emulsifying agents capable of making this water-in-oil type of emulsion are not much affected by water and after the emulsion has been dried down by removal of the water re-contact with water produces little action. By the use of such an emulsion, I am enabled not only to "fat liquor" leather but to introduce in a convenient manner, waterproof qualities into the leather. The emulsifying agent itself may also be incorporated into leather in substantial amounts. The process may be applied to waterproofing other materials. When an emulsifying agent for the water-in-oil type of emulsion is present the interface between the oil and water phases is curved in such a manner as to produce a concave oil surface and convex water surface. So when I incorporate a water-in-oil emulsion into leather and thereafter dry the whole, any re-wetting or penetration of the leather by water is resisted by this tendency of the water to form convex points of contact with the material. As the outer phase in the emulsion I may use the oily material which is to be introduced into the leather or I may use, so to speak, a temporary oily material; an oil which, like kerosene, can be volatilized and dried out after it has served its function of introducing materials into the leather.

Water-in-oil emulsions may be made directly by emulsifying the proper amounts of oily material and of water with the aid of an emulsifier adapted for this purpose. Aluminum oleate, palmitate or stearate may be used, as may also the soaps of other non-alkaline metals, that is, metallic soaps which are insoluble in water. Various other materials insoluble in water and having an affinity for oily materials, tending to make water-in-oil suspensions or emulsions, such as clays, may also be used. Direct production of water-in-oil emulsions, however, is not as easy in practice as producing the other type of emulsion, namely oil-in-water, and then reversing it.

While my invention is applicable for other purposes as hereinafter described, I regard it as particularly applicable in fat liquoring leather. In so using it, the ordinary emulsion used in fat liquoring leather may be made in the usual ways and the emulsion then reversed. One mode of doing this, which also produces a material (aluminum soaps) useful when incorporated in leather, is to treat the emulsion with a salt of aluminum, such as the sulfate or chlorid. A sodium salt and an aluminum soap are formed. The latter reverses the emulsion. The amount of aluminum soap may be merely that necessary to reverse the emulsion; or it may be substantial. As noted, aluminum soaps are desirable bodies for incorporation in leather. Instead of using an aluminum salt, a salt of iron, chromium, zinc, magnesium or calcium may be used, the corresponding metallic soaps being formed.

In a specific embodiment of my invention as thus far described, presuming that I wish to incorporate oil into leather, I may emulsify heavy mineral oil with a five per cent solution of soda soap, using about 100 parts of the solution for 100 parts of the oily material. The soap used may be made from any of the usual oily materials, cottonseed oil, red oil, etc. To the emulsion when formed I add 20 parts of a ten per cent aluminum sulfate solution and incorporate. The emulsion reverses and is now ready for incorporation in the leather.

As just described, the body of the material to be incorporated into leather was oil and greasy material with some aluminum soap as a subordinate constituent. The process, however, may be equally well used for producing a type of waterproofing wherein aluminum soap itself is the major constituent to be incorporated. In this event, I proceed just as before, except that I replace the non-volatile oil with a volatile oil, such as gasoline, kerosene or naphtha; the volatile oil serving merely as an emulsion-producing body and as a vehicle, enabling me to introduce aluminum soap into the leather. For example, 400 parts of a 5 per cent solution of soap may be emulsified with 200 parts of kerosene. This gives an emulsion of oil in water. If there now be added 40 parts of a 10 per cent solution of aluminum sulfate, this being stirred in, the emulsion reverses. It is now an emulsion of aluminum soaps and kerosene, containing water and some dissolved sodium sulfate as a dispersed phase. This mixture can be incorporated into leather readily and on drying the kerosene and the water evaporate leaving the aluminum soap in place on the leather. In incorporating the emulsion into the leather, dry leather can be drummed with the emulsion. Wet leather can also be drummed with the emulsion, there being an exudation of water in this case.

It is of course possible to use intermediate processes wherein there is some fixed oil and some volatile oil, together with the aluminum soap or other soap insoluble in water. The volatile oil is conveniently used to increase the bulk and make the incorporation of the emulsion in the leather easier.

In the present invention the emulsion penetrates the pores of the leather and as the moisture of the leather dries out, so does the emulsified water, and the oil is left containing its emulsifying agent on the surface of the leather fibers. If the oil used is volatile, it also evaporates away. As the pores of the leather are small, on entry of water, in so far as it has any effect or can enter, it simply re-forms a water-in-oil emulsion. For all practical purposes, however, water is prevented from entering the leather and the leather is substantially waterproof. In most embodiments of my invention, I use some kerosene or other volatile oil to aid in giving bulk.

In fat liquoring leather in the ordinary way, the result sought is to lubricate the fibers in some way. This can be done by an oil or by slippery substances, like aluminum soaps or the heavy metal stearates, oleates and palmitates. Either oil or metal soap or mixtures of the two can be introduced by the present method, with the desired result of softness in the finished leather together with substantial waterproofing; this waterproofing being much more permanent than that obtained by the usual fat liquoring methods. While I regard my invention as particularly applicable to treating leather, it of course may be used with any other porous fabric or material which is to be softened and waterproofed.

What I claim is:—

1. The process of softening and waterproofing leather which comprises impregnating such materials with an emulsion of water in oily materials, said emulsion containing a water insoluble soap as the emulsifying agent.

2. The process of waterproofing leather and other porous materials which comprises impregnating such materials with an emulsion of water in oily materials, such emulsion containing an aluminum soap.

3. The process of impregating leather to soften and waterproof the same which comprises producing a "fat liquor" emulsion of the ordinary type, adding to it a water soluble salt of a metal to produce a water insoluble soap and thereby reverse the emulsion and then impregnating leather with the reversed emulsion.

4. The process of impregnating leather and other materials which comprises producing a reversed emulsion with a mixture of a fixed oil and a volatile oil as the outer phase and impregnating such material with such reversed emulsion.

5. The process of impregnating leather and other materials which comprises producing a reversed emulsion with oil as the outer phase, such oil comprising volatile mineral oil, and impregnating such material with such reversed emulsion.

6. In the incorporation of oily matter and aluminum soap into leather the process which comprises treating such leather with such oily matter and aluminum soap in the condition of a reversed emulsion, said reversed emulsion also containing a volatile oil.

In testimony whereof, I have hereunto affixed my signature.

THOMAS BLACKADDER.